US006855398B1

United States Patent
Machino et al.

(10) Patent No.: US 6,855,398 B1
(45) Date of Patent: Feb. 15, 2005

(54) SOUND ABSORBING AND HEAT INSULATING MATERIAL, AND METHOD OF MANUFACTURING SAME

(75) Inventors: Fumikazu Machino, Osaka (JP); Tsuyoshi Higo, Osaka (JP); Toshinobu Kataoka, Osaka (JP); Ryoichi Onoue, Osaka (JP); Toshio Date, Osaka (JP); Tominori Sato, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 09/180,432

(22) PCT Filed: Feb. 27, 1997

(86) PCT No.: PCT/JP97/00598
§ 371 (c)(1),
(2), (4) Date: Feb. 12, 1999

(87) PCT Pub. No.: WO98/38140
PCT Pub. Date: Sep. 3, 1998

(51) Int. Cl.[7] .......................... B32B 27/14; B32B 27/12; B32B 5/02
(52) U.S. Cl. ....................... 428/198; 442/120; 442/179
(58) Field of Search ................................ 442/120, 179; 428/198

(56) References Cited

U.S. PATENT DOCUMENTS 4,504,455 A * 3/1985 Otani et al. ................. 423/447
4,997,716 A * 3/1991 McCullough, Jr. et al. ................. 428/411.1
5,254,396 A * 10/1993 Takemura et al. .......... 428/225

FOREIGN PATENT DOCUMENTS

| EP | 0 428 991 | 5/1991 |
|----|-----------|--------|
| JP | 6-116032 | 4/1994 |
| JP | 8-502768 | 3/1996 |
| JP | 8-217556 | 8/1996 |
| WO | WO 94/06625 | 3/1994 |

* cited by examiner

Primary Examiner—Ula Ruddock
(74) Attorney, Agent, or Firm—Armstrong, Kratz, Quintos, Hanson & Brooks, LLP

(57) ABSTRACT

An object of the present invention is, by utilizing carbon fibers as its constituent material, to provide a thermal-acoustic insulation material having excellent properties in durability, compression resilience, lightness, fireproofness, and non-galvanic corrosiveness. The material of the present invention comprises a wool-like carbon fiber aggregate composed of carbon fibers having an average fiber diameter of 0.5 $\mu$m to 5 $\mu$m and an average fiber length of 1 mm to 15 mm and the contact points of the fibers are bonded together by a thermosetting resin. The galvanic current of the material is 10 $\mu$A or lower in a galvanic cell comprising an electrode composed of the thermal-acoustic insulation material, the other electrode composed of an aluminum plate, and an electrolytic solution composed of 0.45 wt. % sodium chloride aqueous solution.

41 Claims, 12 Drawing Sheets

SOUND ABSORBING AND HEAT INSULATING MATERIAL, AND METHOD OF MANUFACTURING SAME

TECHNICAL FIELD

The present invention relates to a thermal-acoustic insulation material utilizing carbon fibers, and more particularly to a thermal-acoustic insulation material utilizing extra fine carbon fibers with non-galvanic corrosiveness.

The thermal-acoustic insulation material of the present invention is not limited to the material used for insulating both sound and heat, but may be used exclusively for a purpose of absorbing sound as well as exclusively for a purpose of insulating heat.

BACKGROUND ART

Thermal-acoustic insulation materials have widely been recognized as an important member to construct comfortable and energy-saving housing or to protect humans and/or equipment from harsh external environment. Although natural fibers and synthetic resins have conventionally been used for thermal-acoustic insulation materials, these materials have a problem in safety because they are generally flammable and generate toxic fumes in case of fire.

For that reason, inorganic materials have recently been used as an alternative to natural fibers and synthetic resins. In particular, having favorable properties such as nonflammability, formability, and mountability, glass fibers have been widely used as a raw material for thermal-acoustic insulation materials.

However, since glass fibers have a specific gravity of approximately from 2.4 to 2.6 $g/cm^2$, which is quite large, the thermal-acoustic insulation material made of glass fibers does not exhibit sufficient quality in acoustic and thermal insulation per unit mass. In addition, since glass fibers gradually deteriorate by absorbing moisture and they do not have sufficient mechanical strength, the thermal-acoustic insulation material made of glass fibers does not retain enough durability.

Meanwhile, demand for thermal-acoustic insulation materials having ample safety and high quality has immensely been increasing. For example, in high-speed transport means such as high-speed train cars, aircraft, spacecraft, and the like, high-speed and comfortableness required for such means of transport inevitably entail the demand for thermal-acoustic insulation materials having such properties as being highly safe, tough and lightweight. Specifically, the requirements besides excellent acoustic and thermal insulation quality are 1) to be lightweight, 2) to have excellent fire-resistance, 3) not to generate toxic fumes in case of fire, 4) to have no corrosiveness to structural materials, 5) to have excellent mechanical strength and compression resilience, 6) to have excellent abrasion resistance, 7) to have little hygroscopicity, and 8) to have good mountability, and so forth.

As previously mentioned, conventional thermal-acoustic insulation materials including the materials made of glass fibers are not reliable enough for the aforementioned uses. Therefore, there has been awaited the development of a highly reliable thermal-acoustic insulation material usable for the above purposes.

DISCLOSURE OF THE INVENTION

In view of the above-mentioned problems, an object of the present invention is, by utilizing carbon fibers, to provide a thermal-acoustic insulation material which excels not only in acoustic and thermal insulation quality, but also in durability, mechanical strength, compression resilience, lightness, chemical stability, nonflammability, non-hygroscopicity, and such properties that the material do not emit toxic fumes in case of fire, as well as non-galvanic corrosiveness, and non-electrical conductivity.

Carbon fibers generally have high electrical conductivity, excellent antistatic property, and relatively large electromotive force. These characteristics of carbon fibers have been applied to antistatic purposes and the like, but regarded as undesirable for a material for thermal-acoustic insulation materials.

The reasons are as follows. If a thermal-acoustic insulation material is composed of a material having high electrical conductivity, the material itself is likely to become a cause of short circuits. Also, if the fragments of the material fall off from the material and then float in the air, the fragments can go into electric circuits and the like, and thus become a cause of short circuits. Moreover, if the material has electromotive force, there is a possibility that the material causes electrochemical reactions to other members surrounding the material and consequently causes galvanic corrosion to the other members.

One of the objects of the present invention is, as mentioned above, to provide a thermal-acoustic insulation material practically mountable to high-speed train cars, aircraft, and the like. These means of transport generally have metals as their main constituent materials and have a great deal of electric wiring. The purposes of the present invention, therefore, cannot be attained by merely employing carbon fibers in place of glass fibers as a main constituent material in manufacturing thermal-acoustic insulation materials.

Using carbon fibers, the inventors of the present invention have made intensive studies on the methods that can resolve the aforementioned problems. As a result, the inventors have found that the strength of a thermal-acoustic insulation material and its acoustic and thermal insulation quality as well as its galvanic corrosiveness are improved by appropriately setting carbonizing temperatures for carbon fibers. In addition, the inventors have found that galvanic corrosion caused by a thermal-acoustic insulation material comprising carbon fibers as a material can practically be prevented when a galvanic current value of the thermal-acoustic insulation material is controlled at 10 $\mu$A or less. On the basis of this learning, the inventors have completed the present invention with a group of the inventions described hereinafter.

It is to be understood that electrical conductivity of a material is not directly related to galvanic corrosiveness of the material. The galvanic current value specified herein therefore has great significance since it is an important condition required for a thermal-acoustic insulation material having non-galvanic corrosiveness.

The present invention comprises the following inventions.

(1) Invention 1 is a thermal-acoustic insulation material, comprising a wool-like carbon fiber aggregate which is composed of carbon fibers having an average fiber diameter of 0.5 $\mu$m to 5 $\mu$m and an average fiber length of 1 mm to 15 mm, and wherein the fibers are bonded together by a thermosetting resin (2) Invention 2 is a thermal-acoustic insulation material as in the invention 1, wherein a galvanic current is 10 $\mu$A or lower in a galvanic cell which comprises an electrode composed of the thermal-acoustic insulation material, the other electrode composed of an aluminum plate, and the electrolytic solution composed of 0.45 wt. % aqueous sodium chloride solution.

(3) Invention 3 is a thermal-acoustic insulation material as in the inventions 1 or 2, which has a bulk density of 3 kg/m³ to 10 kg/m³.

(4) Invention 4 is a thermal-acoustic insulation material as in one of the inventions 1 to 3, which has a maximum tensile strength of 1.0 g/mm² or higher.

(5) Invention 5 is a thermal-acoustic insulation material as in one of the inventions 1 to 4, which has a compression recovery rate of 70% or higher.

(6) Invention 6 is a thermal-acoustic insulation material as in one of the inventions 1 to 5, wherein a minimum tensile strength of the orthogonal direction to the direction of the maximum tensile strength is 0.04 times or higher as the maximum tensile strength and, at the same time, a tensile strength of the orthogonal direction to both the direction of the maximum tensile strength and the direction of the minimum tensile strength is 0.76 times or higher as the maximum tensile strength.

(7) Invention 7 is a thermal-acoustic insulation material as in one of the inventions 1 to 6, which has a thermal conductivity of 0.039 W/m·° C. or lower.

(8) Invention 8 is a thermal-acoustic insulation material as in one of the inventions 1 to 7, wherein a vertical incident acoustic absorptivity at a frequency of 1000 Hz of the material having a thickness of 25 mm is 48% or higher.

(9) Invention 9 is a thermal-acoustic insulation material as in one of the inventions 1 to 8 wherein the carbon fibers are derived from anisotropic pitch obtained by polymerizing condensed polycyclic hydrocarbon.

(10) Invention 10 is a method of manufacturing a thermal-acoustic insulation material comprising the following steps of:

a spinning step of melting anisotropic pitch obtained by polymerizing condensed 65 polycyclic hydrocarbon, and then discharging the melted matter out of a spinning nozzle with blowing a heated gas from around the spinning nozzle in the same direction to which the melted matter is discharged;

a carbon fiber producing step of producing non-galvanic-corrosive carbon fibers by infusibilizing the spun fibers and then carbonizing the fibers at not lower than 650° C. and lower then 750° C.;

a spraying and accumulating step of accumulating the non-galvanic-corrosive carbon fibers into a wool-like material on a plane with spraying thermosetting resin solution to the fibers; and a heat forming step of forming the accumulated matter with applying heat.

(11) Invention 11 is a method of manufacturing the thermal-acoustic insulation material as in the invention 10, comprising an accumulating step in which the non-galvanic-corrosive carbon fibers are accumulated into a wool-like material, and a spraying step in which thermosetting resin solution is sprayed to the wool-like material of accumulated carbon fibers.

(12) Invention 12 is a method of manufacturing the thermal-acoustic insulation material as in the inventions 10 or 11, wherein the spraying and accumulating step or the accumulation step comprises a method of accumulating fibers by dropping the carbon fibers opened by the air from a height of at least 100 cm or higher.

(13) Invention 13 is a method of manufacturing the thermal-acoustic insulation material as in the inventions 11 or 12 wherein the wool-like carbon fiber accumulation has a bulk density of 1.3 kg/m³ or lower.

The tensile strength was measured with a constant-traverse-rate-type tensile tester, at a tensile testing speed of 20 mm/min. The length of the specimen was 50 mm and the size of the specimen was 50 mm×50 mm×25 mm thick (see FIGS. 15 and 16). The method of the tensile test is detailed in [The conditions in measuring tensile strengths], which will be described later.

The thermal conductivity was measured at 22° C., according to ASTM C-518 (American Society for Testing and Material: Heat flow meter method).

The vertical incident acoustic absorptivity was measured according to JIS (Japanese Industrial Standards) A-1405.

The compression recovery rate was measured as follows: The thickness of a thermal-acoustic insulation material specimen having a size of 100 mm×100 mm×a thickness of 25 mm was measured after 24 times repeating a cycle of applying a pressure of 0.7 kg/cm² to the specimen by using pressure elements with a diameter of 76 mm from the directions of its thickness for 30 minutes and then releasing the pressure. The values are indicated in a percentage to the initial thickness (25 mm).

The galvanic current mentioned herein is a value of the electric current measured in a galvanic cell expressed by a cell diagram of: a carbon fiber electrode |0.45 wt. % aqueous sodium chloride solution | an aluminum electrode. The detail will be described later.

THE BEST MODE FOR CARRYING OUT THE PRESENT INVENTION

The present invention is detailed hereinafter with reference to experiments and FIGS. 1 through 13 showing the results of the experiments. The description hereinafter will clarify the effects of the present invention.

Unless specified, the carbon fibers used in the experiments hereinafter comprised anisotropic pitch as a material, and the fibers had an average fiber diameter of 1.3 $\mu$m (fiber diameter: 0.5 $\mu$m to 3.5 $\mu$m) and an average fiber length of 5 mm (fiber length: 1 mm to 15 mm). The thermal-acoustic insulation materials used in the experiments (only a three dimensional structure of the carbon fibers was used) were produced from the aforementioned carbon fibers bonded together by a thermosetting resin, and the resulting materials had a bulk density of 4.8 kg/m$^3$. The details of the producing method, etc. of the thermal-acoustic insulation materials will be described later. The thermal-acoustic insulation material made of the carbon fibers whose contact points are bonded together by a thermosetting resin is hereinafter referred to as 'a CF thermal-acoustic insulation material'. The conventional thermal-acoustic insulation material made of glass fibers is hereinafter referred to as 'a thermal-acoustic insulation material made of glass fibers'. (In the figures, it is shown as 'GF').

First, the methods of the experiments will be given below.

The Method of Measuring Galvanic Currents

Figure 12:
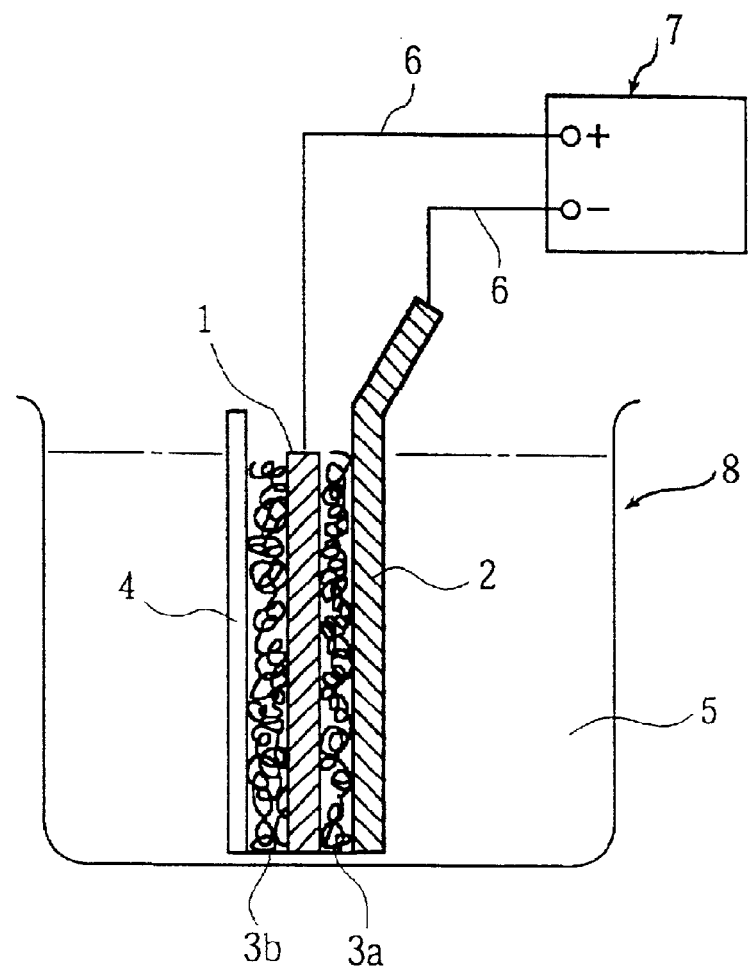
FIG. 12 is a schematic diagram of a galvanic cell.

FIG. 12 shows a device for measuring galvanic currents. In FIG. 12, 1 is a carbon fiber electrode (one side of the electrodes). For measuring a galvanic current of carbon fibers themselves, 100 mg of the carbon fibers was prepared into an aggregate of 1 mm thick, 40 mm wide and 50 mm high, and the resulting aggregate was used as the carbon fiber electrode. For measuring a galvanic current of a CF thermal-acoustic insulation material, the CF thermal-acoustic insulation material made into the same size as the aforementioned aggregate was used as a carbon fiber electrode.

In FIG. 12, 2 is an aluminum electrode composed of aluminum alloy 2024 (the other side of the electrodes) with the dimensions of 1 mm thick, 40 mm wide and about 50 mm high. A glass fiber cloth 3a has a thickness of 0.2 mm, and is disposed between the carbon fiber electrode 1 and the aluminum electrode 2 to restrict the distance between the two electrodes. A glass plate 4 supports a side of the carbon fiber electrode 1 together with a glass fiber cloth 3b disposed between the carbon fiber electrode 1 and the glass plate 4, so that the carbon fibers composing the electrode 1 do not come off.

Electrolyte 5 consists of 0.45 wt. % aqueous sodium chloride solution (200 ml). In FIG. 12, 7 is a zero-shunt ammeter (HM-104, manufactured by Hokuto Denko Co., Ltd., Japan), and 8 is a beaker made of glass (300 ml). An electrode group 9 composed of the carbon fiber electrode 1, the aluminum electrode 2, the glass fiber cloth 3a, the glass fiber cloth 3b and the glass plate 4 is immersed in the electrolyte 5, and the electrode 1 and electrode 2 are connected to the zero-shunt ammeter 7 with lead wires 6.

By using the device described above, galvanic currents were measured with the ammeter 7 after the electrode group 9 was immersed in the electrolyte 5 for one hour. The values thus measured were employed as galvanic currents herein.

The Method of Assessing Galvanic Corrosiveness

Figure 13:
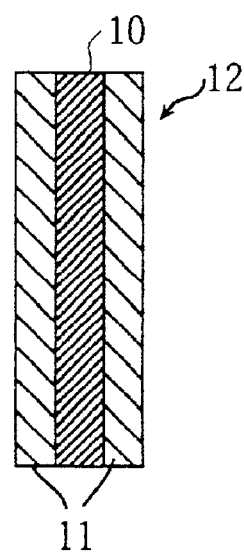
FIG. 13 is an explanatory diagram to illustrate a galvanic corrosion test.

Whether a specimen has galvanic corrosiveness or not was assessed by using a test piece shown in FIG. 13. In FIG. 13, 10 is either a wool-like carbon fiber aggregate specimen prepared into a dimension of 40×40 mm square and 20 mm thick, or a CF thermal-acoustic insulation material prepared into the same dimension as the aforementioned aggregate. In the same figure, 11 is a plate made of aluminum alloy 2024 having a dimension of 40×40 mm square and 1 mm thick, where the surface thereof is polished so as to be a specular surface and then treated with a solution containing 2% $CrO_3$ and 2% $H_3PO_4$ A test piece 12 is composed of the specimen 10 sandwiched by the aluminum alloy plates 11.

The test piece 12 was first left in the room where the relative humidity was 90% and the temperature was 40° C. for 24 hours, next placed in the room where the conditions were normal (the temperature: 18 to 27° C., the relative humidity: 40 to 70%), and left for another 24 hours. Then, the test piece 12 was placed back in the room where the relative humidity was 90% and the temperature was 40° C. This cycle was repeated 15 times (30 days). After the cycles were completed (after 30 days), the specular surface of the aluminum was eye-assayed. When the surface showed the same state as its initial state, it was defined as 'no galvanic corrosion observed (−)'. When a little tarnish was recognized on the surface, it was defined as 'a little galvanic corrosion observed (±)'. When the surface was obviously corroded, it was defined as 'galvanic corrosion observed (+)'.

For thermal-acoustic insulation materials, tensile strength, thermal conductivity, vertical incident acoustic absorptivity and compression recovery rate were measured according to the methods described above. For single fibers, tensile strength was measured in accordance with JIS R-7601. The details of the measurement methods are described in the corresponding sections herein.

Secondly, referring to the figures, the results of the experiments are detailed below.

The Relationship Between Galvanic Currents and Galvanic Corrosion

Figure 1:
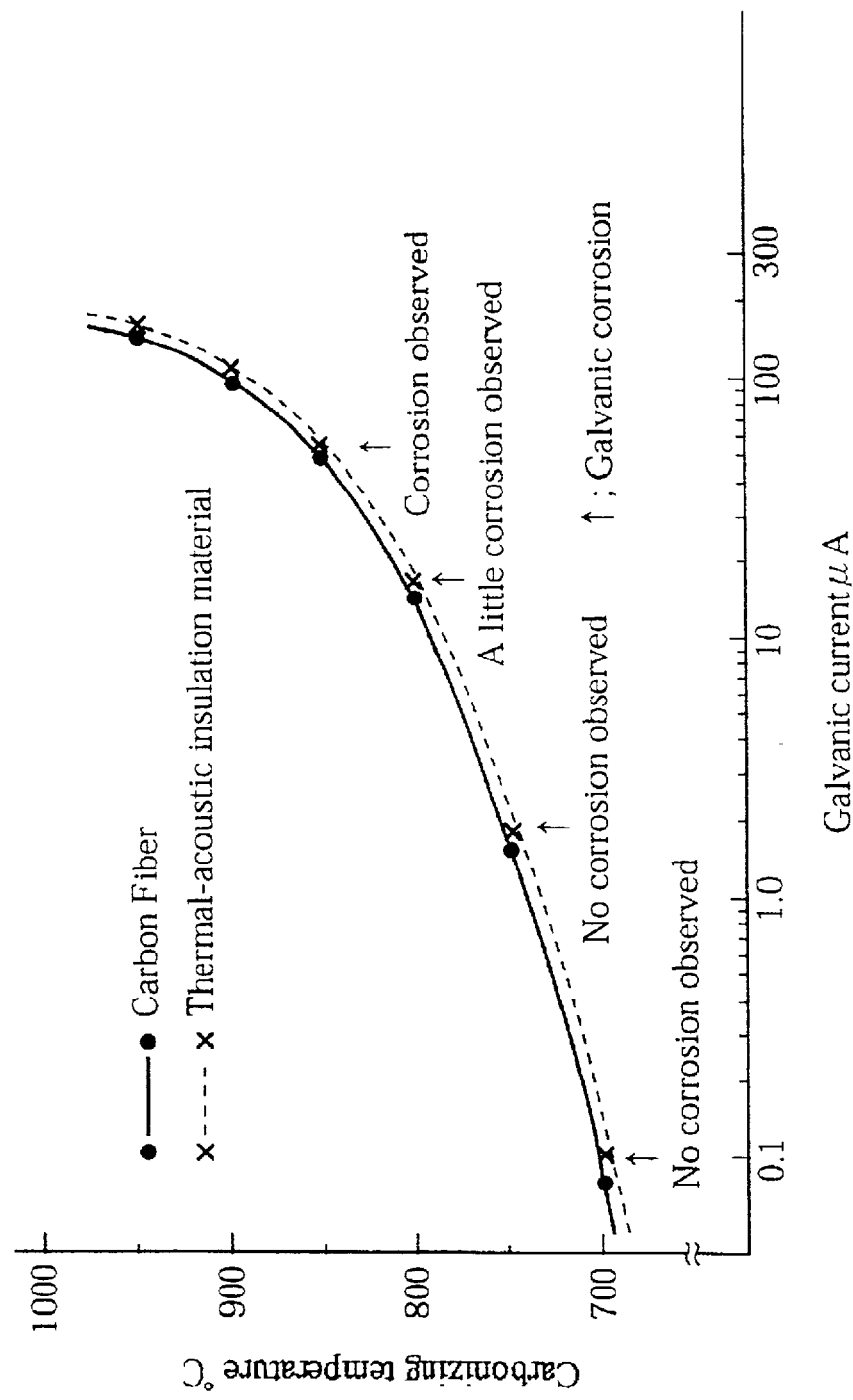
FIG. 1 is a graph showing the relationship of carbonizing temperatures for carbon fibers to galvanic currents and galvanic corrosion.

FIG. 1 shows the relationship between the carbonizing temperatures for the carbon fiber precursors, the galvanic currents of the carbon fibers after a carbonizing treatment and of the CF thermal-acoustic insulation materials utilizing the carbon fibers, and the occurrence of galvanic corrosion (t). The carbon fiber precursors were produced from anisotropic pitch obtained by polymerizing condensed polycyclic hydrocarbon, spun into an average fiber diameter of 1.3 $\mu$m and an average fiber length of 5 mm and then subjected to an infusibilizing treatment.

In FIG. 1, λ-λ shows the galvanic currents of the carbon fibers, x-x shows the galvanic currents of the CF thermal-acoustic insulation materials. The x-axis (galvanic currents) in the figure is indicated by a logarithmic scale.

As apparent in FIG. 1, as the carbonizing temperatures rose, the galvanic currents became exponentially larger. As to the occurrence of galvanic corrosion, a little corrosion was observed at a galvanic current of 20 $\mu$A, while no corrosion was observed at 10 $\mu$A or lower.

Judging from the results above, the occurrence of galvanic corrosion can be practically prevented by controlling a galvanic current of carbon fibers at 20 μA or lower, preferably at 10 μA or lower. The correspondence between the x-axis and the occurrence of galvanic corrosion indicates that the carbonizing temperature should be controlled at 800° C. or lower, or preferably at 750° C. or lower, to produce the carbon fibers which do not cause galvanic corrosion.

In order to sufficiently carbonize the carbon fiber precursors, however, the carbonizing temperature needs to be 550° C. or higher. If the temperature is lower than 550° C., it is possible that the carbonizing treatment is insufficient. For these reasons, the carbonizing temperature should be controlled within the range of 550° C. to 800° C., or preferably 550° C. to 750° C.

In the experiment concerning FIG. 1, a little galvanic corrosion was observed when the galvanic current of the carbon fibers was 20 μA. However, the above-described test results regarding galvanic corrosiveness were obtained under such severe conditions that the specimen was exposed to a temperature of 40° C. and a relative humidity of 90% repeatedly. Compared to this, the conditions under which thermal-acoustic insulation materials are normally used are not so severe. It is therefore believed that when the galvanic current is controlled at lower than 20 μA, the occurrence of galvanic corrosion can be prevented.

There was a slight difference between the galvanic currents of carbon fibers themselves (λ-λ) and the galvanic currents of the CF thermal-acoustic insulation materials utilizing the carbon fibers (x-x). This difference is considered to have been the effect of the thermosetting resin contained in the CF thermal-acoustic insulation materials. That is, the thermosetting resin worked to lower the galvanic currents. For this reason, it is considered that a CF thermal-acoustic insulation material which practically causes no galvanic corrosion will be obtained if the material is produced from the carbon fibers having a galvanic current of 20 μA or lower. Nevertheless, as mentioned above, it is more preferable to control the galvanic current at 10 μA or lower.

Figure 2:
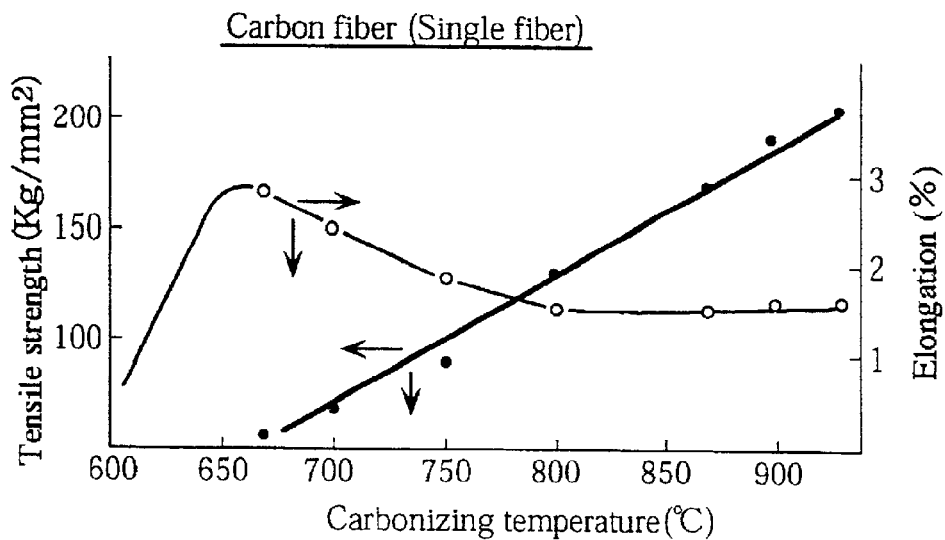
FIG. 2 is a graph showing the relationship between carbonizing temperatures for carbon fibers and tensile strengths of the single fibers.
Figure 3:
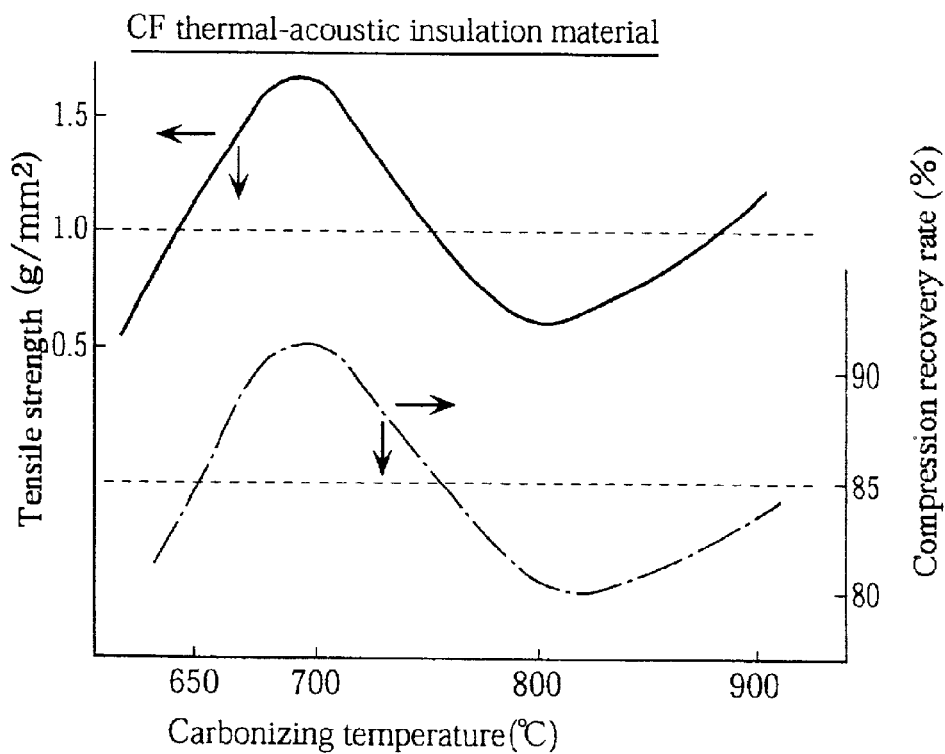
FIG. 3 is a graph showing the relationship between carbonizing temperatures for carbon fibers and tensile strengths of a thermal-acoustic insulation material comprising the carbon fibers.

The Relationship of Carbonizing Temperatures to Tensile Strengths and Elongations FIG. 2 shows the relationship of the carbonizing temperatures to the tensile strengths kg/mm$^2$) and elongations of the single fibers. The upper graph of FIG. 3 shows the relationship between the tensile strengths in the lengthwise direction of the CF thermal-acoustic insulation materials (g/mm$^2$) and the carbonizing temperatures for the carbon fibers which constitute the materials. The lower graph of FIG. 3 shows the relationship between the compression recovery rates (%) of the CF thermal-acoustic insulation materials and the carbonizing temperatures.

Concerning the single fibers, the tensile strength values herein were measured according to JIS R-7061. However, since it is difficult to measure the tensile strengths of extra fine fibers with diameters of 0.5 μm to 3.5 μm (an average fiber diameter of 1.3 μm), the results shown in FIG. 2 were obtained according to the following method. First, carbon fibers with diameters of 10 μm to 13 μm were prepared under the same conditions except their diameters, and the tensile strengths of the prepared fibers were measured. Then, the measured results were converted into the values per unit cross-sectional area, and the converted values are shown in the figures. Concerning the CF thermal-acoustic insulation materials, the materials employed in this experiment were composed only of the three-dimensional structures (bulk density: 4.8 kg/m$^3$) of carbon fibers, and the tensile strength values were measured according to the conditions described later in "The conditions in measuring tensile strength".

As apparent in FIG. 2, as the carbonizing temperatures became higher, the tensile strengths of the carbon fibers themselves became larger, forming a graph like a linear function. Concerning the elongations, the largest value was observed at about 650° C., the large elongation values were obtained from 625° C. to 800° C., and the values kept unchanged over 800° C.

As apparent in FIG. 3, concerning the tensile strengths of the CF thermal-acoustic insulation materials, the largest value was at around 700° C. and the smallest was at around 800° C. (the upper graph in FIG. 3).

The relationship between the compression recovery rates and the carbonizing temperatures for the CF thermal-acoustic insulation material showed similar results to the above-mentioned relationship between the tensile strengths and the carbonizing temperatures (the lower graph in FIG. 3).

From these results, it is understood that carbon fibers having a large elongation value can be produced by the carbonizing treatment at about 625° C. to 800° C. It is also understood that if the carbon fibers thus produced are employed in producing a CF thermal-acoustic insulation material, it is possible to produce the CF thermal-acoustic insulation material having a tensile strength of 1.0 g/mm$^2$ or higher, and that the resulting material thereby has an excellent compression recovery rate.

In FIGS. 2 and 3, the relationship between the tensile strengths and the carbonizing temperatures, and the relationship between the compression recovery rates and the carbonizing temperatures both resulted in quadric curves having maximum values and minimum values unexpectedly, while the relationship between the tensile strengths of the carbon fibers (single fibers) and the carbonizing temperatures resulted in a graph like a linear function. The reason for this is considered to be that the elongations of carbon fibers significantly affects the tensile strengths and the compression recovery rates of the CF thermal-acoustic insulation materials. Now, the consideration to this matter is given below.

Figure 14:
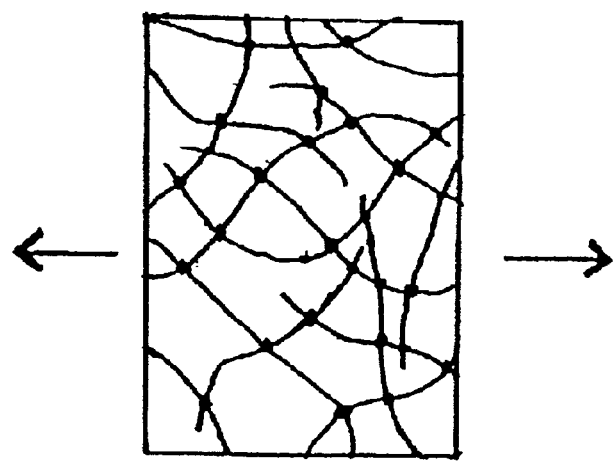
FIG. 14 is a concept diagram showing the state of contact points of the carbon fibers that constitute a carbon fiber thermal-acoustic insulation material. (Contact points: ·)

FIG. 14 is a concept diagram showing the contact state of the carbon fibers which constitute a CF thermal-acoustic insulation material (contact point: ·). With reference to FIG. 14, when a CF thermal-acoustic insulation material is stretched toward the directions indicated by the allows, the shape of the meshes changes and each line segment which constitutes the meshes turns to the stretching directions. However, because the length of each line segment varies, the line segments which constitute certain sides of the meshes receive greater tension than those of the others. As a result of this, the line segments are cut off, or the contact points (·) bonding the segments together are detached.

In the case where the meshes are composed of the line segments (i.e. carbon fibers) having large extensibility, even if specific sides (line segments) are stretched with larger tension than the rest of the sides, the extension in the specific side enables the meshes to endure the tension due to the resultant force % with the others sides. In other words, as a result of the meshes resisting the tension by working as a network, the cutoffs of the line segments and the detachments of the connected points ( ) are reduced, and therefore the larger tensile strength of the whole material is obtained. It is considered that the tensile strength as a network becomes the largest when the elongation and the tensile strength of single fibers are best balanced.

The results shown in FIGS. 2 and 3 indicate that when the carbonizing treatment is carried out at 700° C., the tensile strength and the elongation of the single fibers are best balanced and thus the tensile strength of the whole material (the tensile strength of the CF thermal-acoustic insulation material) becomes large, and so does the compression recovery rate of the CF thermal-acoustic insulation material.

The Difference Between Isotropic Pitch and Anisotropic Pitch

Figure 4:
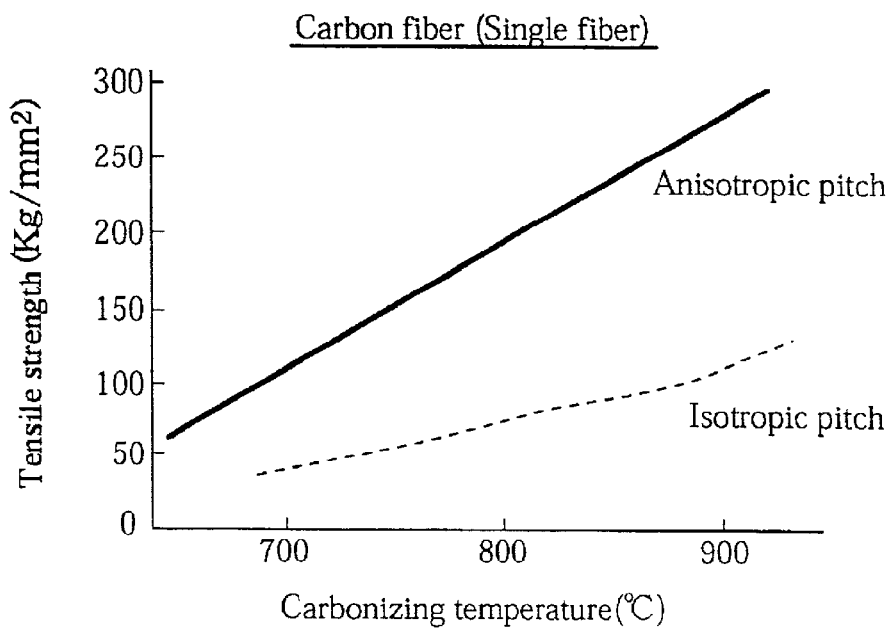
FIG. 4 is a graph showing the relationship between carbonizing temperatures for carbon fibers (anisotropic pitch and isotropic pitch) and tensile strengths of the single fibers.
Figure 5:
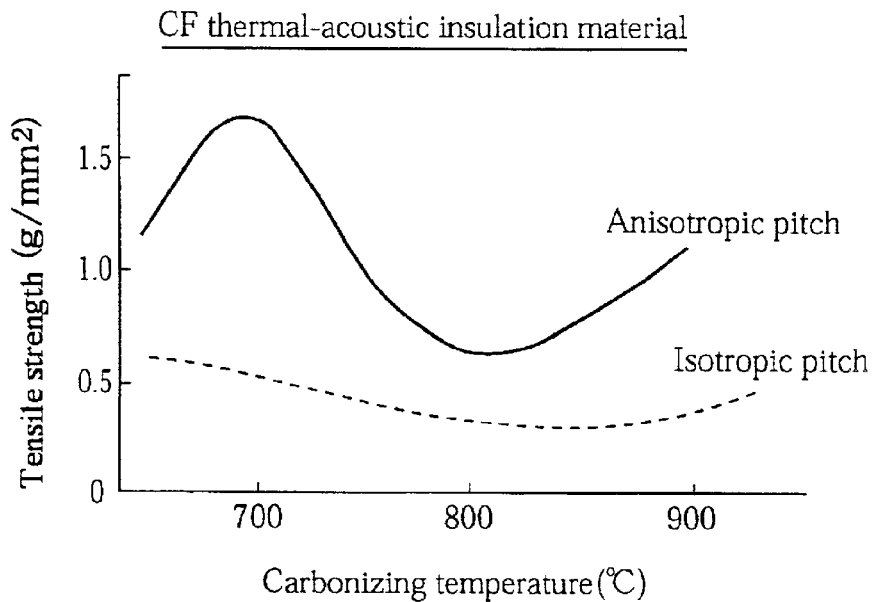
FIG. 5 is a graph showing the relationship between carbonizing temperatures for carbon fibers (anisotropic pitch and isotropic pitch) and tensile strengths of thermal-acoustic insulation materials comprising the carbon fibers

FIG. 4 shows the relationship between the carbonizing temperatures for carbon fibers and the tensile strengths of the fibers. The fibers used in this experiment were the carbon fibers manufactured from anisotropic pitch a obtained by polymerizing condensed polycyclic hydrocarbon and the ones manufactured from isotropic pitch made from coal tar. FIG. 5 shows the relationship between the carbonizing temperatures for those carbon fibers and the tensile strengths (in the lengthwise direction) of the CF thermal-acoustic insulation materials (bulk density 4.8 kg/m$^3$). The CF thermal-acoustic insulation materials used in this experiment are produced from the above-mentioned carbon fibers.

As apparent in FIG. 4, the carbon fibers manufactured from anisotropic pitch had far larger tensile strengths than the carbon fibers manufactured from isotropic pitch. Also, as apparent in FIG. 5, there was no maximum value and minimum value in the tensile strengths of the CF thermal-acoustic insulation materials comprising the carbon fibers manufactured from isotropic pitch, as opposed to the graph of the CF thermal-acoustic insulation materials comprising the carbon fibers manufactured from anisotropic pitch. From the results of this experiment, it is concluded that the existence of the maximum and minimum tensile strength value is a property particular to the carbon fibers manufactured from anisotropic pitch obtained by polymerizing condensed polycyclic hydrocarbon. The existence of the maximum and minimum value has therefore a great significance in improving the quality and production efficiency of the CF thermal-acoustic insulation material of the present invention.

The following are concluded from the results of the experiments shown in FIGS. 1 through 5. Anisotropic pitch obtained by polymerizing condensed polycyclic hydrocarbon should be employed as a material of the carbon fiber precursors in view of the elongation (toughness) of the carbon fibers and the tensile strength of the CF thermal-acoustic insulation material produced from 0.5 the precursors. The carbonizing temperature for carbon fiber precursors should be 550° C. or higher but lower than 800° C., more preferably 550° C. to 750° C., or most preferably 650° C. to 750° C. If a CF thermal-acoustic insulation material is produced from the carbon fibers subjected to the carbonizing treatment at 650° C. to 750° C., the resulting material will have a tensile strength of 1.0 g/mm$^3$ or higher and a galvanic current of 10 μA or lower. The CF thermal-acoustic insulation material thus obtained practically causes no galvanic corrosion.

Figure 6:
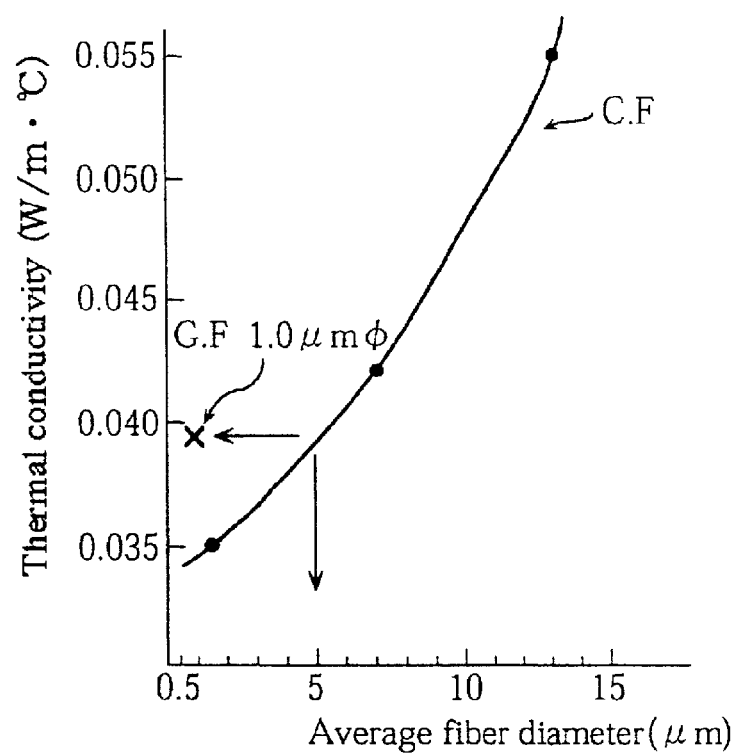
FIG. 6 is a graph showing the relationship between diameters of carbon fibers and thermal conductivity of thermal-acoustic insulation materials.
Figure 7:
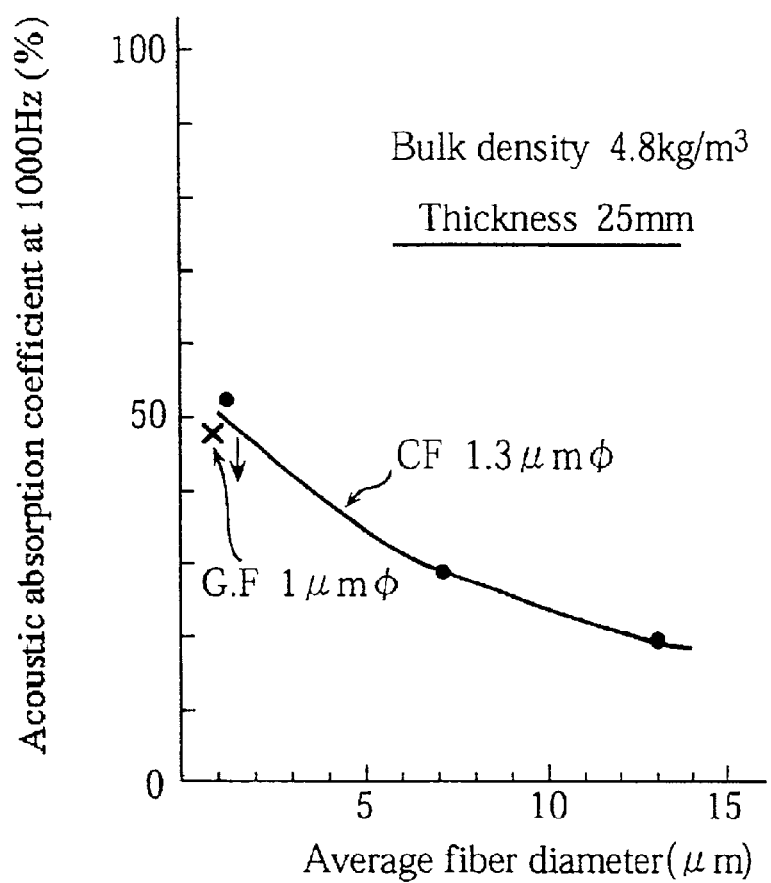
FIG. 7 is a graph showing the relationship between diameters of carbon fibers and vertical incident acoustic absorptivities of thermal-acoustic insulation materials at a frequency of 1000 Hz.

The Relationship of Fiber Diameters to Thermal Conductivity and Vertical Incident Acoustic Absorptivities FIG. 6 shows the relationship between the thermal conductivity λ (W/m·° C.) of the CF thermal-acoustic insulation material (bulk density: 4.8 kg/m$^3$, thickness: 25 mm) and the average diameters of the carbon fibers composing the material. FIG. 7 shows the relationship between the average diameters of the carbon fibers composing the material and the vertical incident acoustic absorptivities at 1000 Hz of the material. The thermal conductivity and the vertical incident acoustic absorptivity of a conventional thermal-acoustic insulation material made of glass fibers (GF, bulk density: 4.8 kg/m$^3$, average fiber diameter: 1 μm, average fiber length: 1 mm) are also shown in the FIG. 6 and FIG. 7 for a comparison (plot: x).

Figure 11:
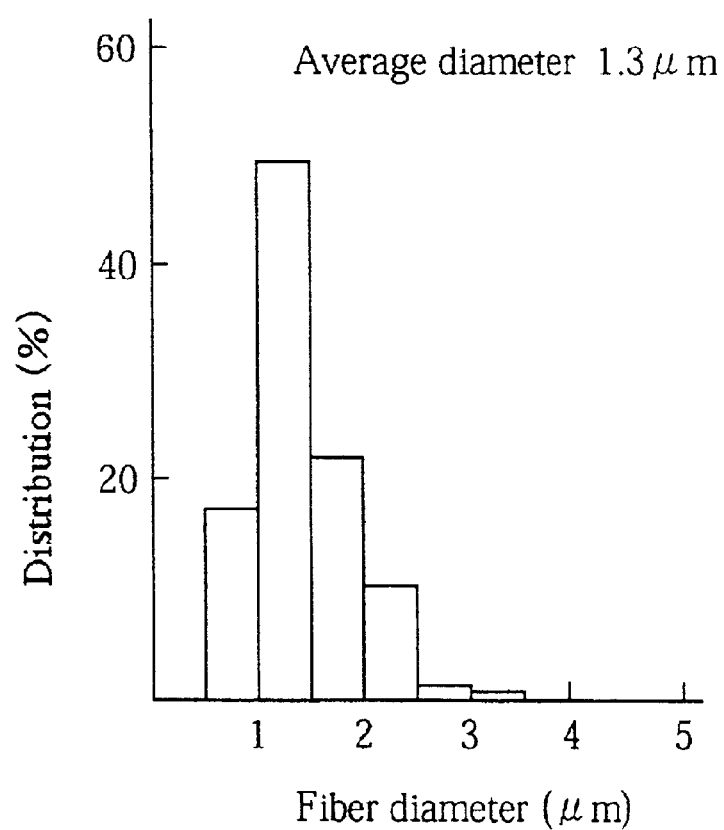
FIG. 11 is a histogram showing the distribution of diameters of the precursor fibers used in Examples 1 to 6 and Comparative Examples 1 and 2, which are described later.

The values in FIG. 6 and FIG. 7 were obtained according to a trial-and-error method. The reason is that, since the diameters of manufactured carbon fibers are distributed as shown in FIG. 11, a great deal of ingenuity in manufacture process and trouble in measurement process is required in preparing a CF thermal-acoustic insulation material having a specific average fiber diameter.

FIG. 6 shows that the larger the diameter of the carbon fibers is, the greater the thermal conductivity. FIG. 6 also shows that the CF thermal-acoustic insulation material comprising the carbon fibers having an average diameter of 5 μm or smaller can attain the degree of thermal insulation quality equal to or higher than that of the thermal-acoustic insulation material made of glass fibers having an average diameter of 1 μm (thermal conductivity: 0.039 W/m·° C.). In other words, whether or not the average diameter stays within the value limitation of 5 μm determines whether or not the degree of thermal insulation quality of a CF thermal-acoustic insulation material is equal to or higher than that of the material made of glass fibers having an average diameter of 1 μm. In FIG. 6, even when the carbon fibers having larger average diameters than the average diameter of the glass fibers were employed, the degree of thermal insulation quality was still higher than that of the material comprising the glass fibers. This is surprisingly desirable, since carbon fibers having larger diameters are easier to manufacture.

FIG. 7 shows that the larger the average diameter of carbon fibers is, the less the vertical incident acoustic absorptivity. FIG. 7 also shows that the CF thermal-acoustic insulation material comprising the carbon fibers having an average diameter of approximately 2 μm or smaller can attain the acoustic absorptivity equal to or higher than that of the conventional material made of glass fibers (48% or higher when the thickness is 25 mm). In other words, whether or not the average diameter stays within the value limitation of 2 μm determines whether or not the acoustic absorption quality of a CF thermal-acoustic insulation material is equal to or higher than that of the thermal-acoustic insulation material made of glass fibers having an average diameter of 1 μm. In FIG. 7, even when the carbon fibers having larger average diameters than the average diameter of the glass fibers were employed, the acoustic absorptivities were higher than that of the material made of the glass fibers. Again, this is surprisingly desirable, since carbon fibers having larger diameters are easier to manufacture.

The above results demonstrate that it is preferable to set an average diameter of carbon fibers at 5 μm or smaller, or more preferably 2 μm or smaller. However, in the present state of art, it is extremely difficult to manufacture carbon fibers with an average fiber diameter of less than 0.5 μm. A preferable average diameter of carbon fibers is, therefore, 0.5 μm to 5 μm, or more preferably 0.5 μm to 2 μm.

Concerning the length of carbon fibers (fiber length), it is difficult to manufacture the carbon fibers having an average fiber length of more than 15 mm when the fibers are extra fine carbon fibers with an average fiber diameter of 0.5 μm to 5 μm. Moreover, the fibers longer than 15 mm are not preferable because the fibers tend to be oriented two-dimensionally in producing the carbon fiber aggregate. Likewise, if the average fiber length is shorter than 1 mm, it is impossible to form desirable three-dimensional structures because the intertwinement of the fibers cannot develop easily. Further, the fibers with an average fiber diameter of 1 mm are likely to produce such problems that the fibers are easily detached from the structures, causing faults in electric appliances surrounding the structures by the fiber fragments entering the electric circuits. On the other hand, the fibers having an average length of 3 mm to 8 mm are easy to be manufactured and to be oriented three-dimensionally.

For the above reasons, it is preferable to set an average fiber lengths at 1 mm to 15 mm, or more preferably at 3 mm to 8 mm.

Figure 8:
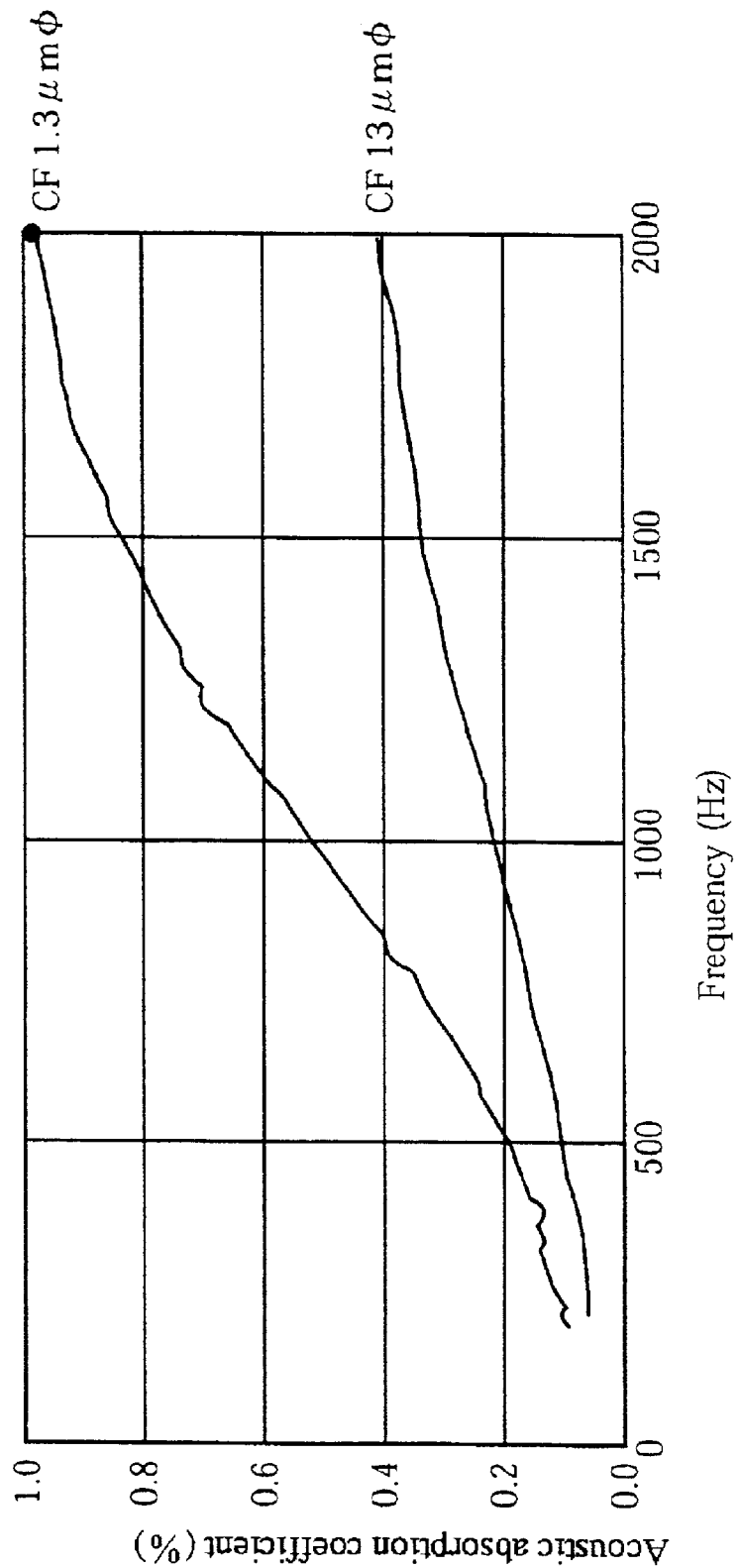
FIG. 8 is a graph showing sound absorption characteristics of thermal-acoustic insulation materials having carbon fibers as its main constituent.

In FIG. 8, the graphs shows the vertical incident acoustic absorptivities against frequencies concerning the CF thermal-acoustic insulation material comprising the carbon fibers with an average diameter of 1.3 μm and the material comprising the carbon fibers with an average diameter of 13 μm.

From the comparison of the above materials, it is understood that the CF thermal-acoustic insulation material comprising extra fine carbon fibers with an average diameter of 1.3 μm has excellent acoustic absorption quality particularly in a high frequency range.

Bulk Density and Thermal Insulation Property

Figure 9:
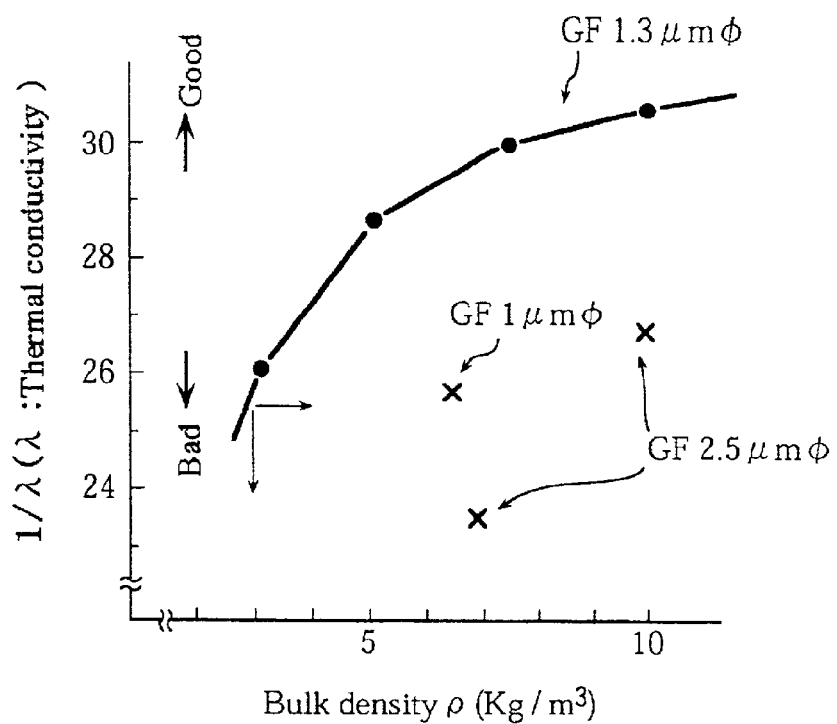
FIG. 9 is a graph showing the relationship between bulk densities of thermal-acoustic insulation materials having carbon fibers as its main constituent and their thermal insulating qualities (1/λ).

A variety of CF thermal-acoustic insulation materials only different in their bulk densities were prepared to measure their thermal conductivity $\lambda(\lambda=W/m\cdot°\ C.$, W means 'watt'). The results of the measurements are shown in FIG. 9 as the relationship between the bulk densities and $1/\lambda$ (thermal insulation property). With reference to FIG. 9, the relationship between the bulk density and the thermal insulation property ($1/\lambda$) of the CF thermal-acoustic insulation material is explained below. FIG. 9 shows both the results of the CF thermal-acoustic insulation materials (thickness: 25 mm, represented by $\lambda$-$\lambda$) and of the conventional thermal-acoustic insulation materials which has an average fiber diameter of 1.0 μm or 2.5 μm and an average fiber length of 5 to 15 mm (represented by x).

FIG. 9 illustrates that the larger the bulk density is, the better the thermal insulation property. It is noted that, however, the degree of the improvement decreases, as the bulk density becomes larger. It is also noted that the thermal insulation property of a CF thermal-acoustic insulation material is far superior to that of the material made of glass fibers when compared at the same bulk density. This indicates that even with a smaller weight, a CF thermal-acoustic insulation material can achieve the same degree of thermal insulation property as that of the thermal-acoustic insulation material made of glass fibers. Further, it is noted that, if the CF thermal-acoustic insulation material has a bulk density of 3 kg/m$^3$ or higher, the effect of thermal insulation is equal to or higher than that of the material comprising glass fiber with an average fiber diameter of 1.0 μm.

Figure 10:
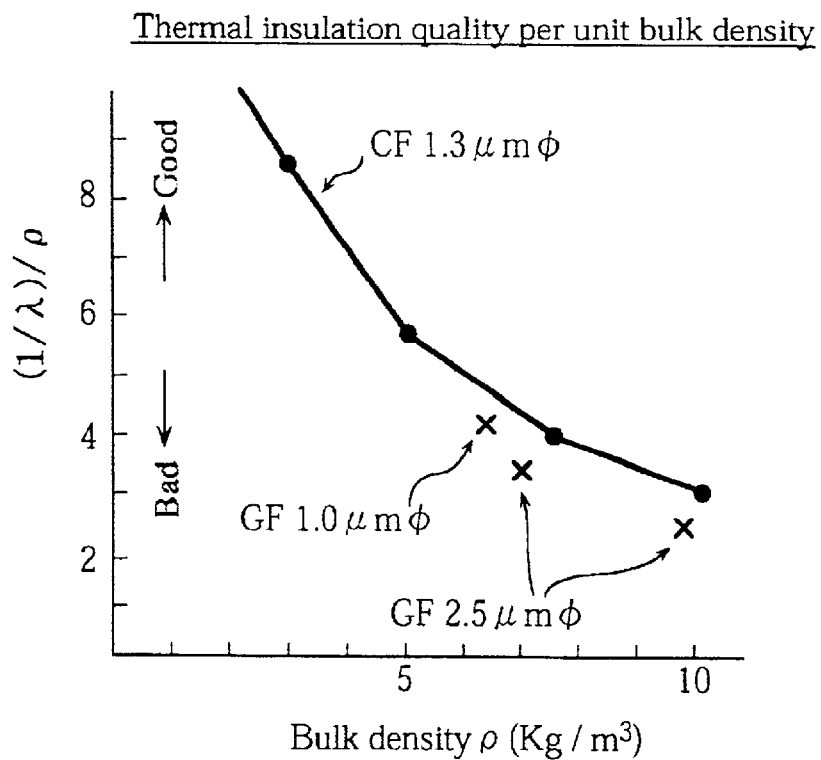
FIG. 10 is a graph showing the relationship between bulk densities of thermal-acoustic insulation materials having carbon fibers as its main constituents and their thermal insulating qualities per unit bulk density ((1/λ)/ρ).

FIG. 10 is a graph in which the x-axis shows the bulk density and the y-axis the values obtained by dividing thermal insulation property ($1/\lambda$) by bulk density $\rho((1/\lambda)/\rho)$. This graph illustrates the thermal insulation property of a thermal-acoustic insulation material per unit bulk density (thermal insulation quality per weight). In FIG. 10, as the bulk density increases, the thermal insulation property per unit bulk density decreases forming almost a linear line. This indicates that the smaller the bulk density is, the better the thermal insulation quality per weight, and that a CF thermal-acoustic insulation material has better thermal insulation quality per weight (($1/\lambda$)$\rho$) than the material made of glass fibers (x).

Further, the thermal insulation quality per weight of the CF thermal-acoustic insulation material with a bulk density of 10 kg/m$^3$ is almost equal to that of the material made of glass fibers with a bulk density of 6.3 kg/m$^3$ (x). This result demonstrates that if the bulk density of a CF thermal-acoustic insulation material is 10 kg/m$^3$ or less, the thermal insulation quality can be guaranteed to be equal to or higher than that of the material made of glass fibers (bulk density: 6.7 kg/m$^3$), which is a typical conventionally-used thermal-acoustic insulation material.

From the results mentioned above, it is concluded that a bulk density of a CF thermal-acoustic insulation material should preferably be 3 kg/m$^3$ to 10 kg/m$^3$.

Compression Recovery

Compression recovery rate is one of the properties that reflects mechanical strength of a CF thermal-acoustic insulation material. If a thermal-acoustic insulation material with a small compression recovery rate is used under such conditions that the material is affected by vibration and compression force resulting from the vibration, the initial acoustic and thermal insulation quality will fade away in a short period. One of the reasons is that if the compression recovery rate is small, the bulk of the material gradually decreases due to the vibration and compression, which brings about the shrinkage of the inner gap of the material and thereby leads to the deterioration of the material's quality. Another reason is that the decrease of the bulk causes a gap in the space in which the material was fitted.

One of the objects of the present invention is to provide a CF thermal-acoustic insulation material having the quality equal to or higher than that of the conventional material made of glass fibers. The material of the present invention, therefore, has to assure the same degree of the compression recovery rate as that of the material made of glass fibers. The typical conventionally-used material made of glass fibers (bulk density: 6.7 kg/$^3$) has a compression recovery rate of 70%. (See Comparative Example 4 in table 4, which will be described later.)

On that account, a compression recovery rate of a CF thermal-acoustic insulation material should be at least 70% or higher, or more preferably 85% or higher. The reason is that if the compression recovery rate of a CF thermal-acoustic insulation material is 85% or higher, the material can endure the external forces in mounting and manufacturing, and the material can also be usable under such conditions that the material is constantly affected by vibration and compression force.

The Tensile Strength Ratios in Three-Dimensional Directions

A further limiting factor concerning a CF thermal-acoustic insulation material of the present invention will be described below. One of the objects of the present invention is to provide a lightweight and high-quality CF thermal-acoustic insulation material utilizing extra fine carbon fibers. Another object of the present invention is to provide the material usable under such conditions that the material is constantly affected by vibration and compression force, for example on high-speed train cars and aircraft. However, when extra fine carbon fibers are employed in producing a CF thermal-acoustic insulation material with a small bulk density, the mechanical strength thereof results in a smaller value than that of the material made of medium fine fibers with a large bulk density, and therefore the material made of extra fine fibers is likely to be inferior in its handleability, mountability, and durability.

In particular, if the strengths in the three-dimensional directions are extremely different in each direction, the resulting material easily breaks from the weakest direction. Nevertheless, it is difficult to render the absolute strength in each direction very large, as long as extra fine fibers are employed and a small bulk density is required. The difference between the tensile strengths in each direction of x-axis, y-axis and z-axis in three-dimensional coordinates (hereinafter referred to as 'three axes') should therefore be rendered small so that the CF thermal-acoustic insulation material can retain a small weight and bulk density as well as excellent handleability, mountability, durability and compression recovery rate.

In view of the above reasons, for a preferable embodiment of the present invention, the minimum tensile strength in the orthogonal direction to the maximum tensile strength direction of a thermal-acoustic insulation material should be equal to or greater than 4% of the maximum tensile strength. The tensile strength in the direction orthogonal to both the directions of the maximum tensile strength and the minimum tensile strength should be equal to or greater than 35% of the maximum tensile strength.

The grounds of these values will be described below with reference to table 1 and table 2. Table 1 shows the measurement results of the tensile strengths of the thermal-acoustic insulation materials only varied in their bulk densities. The values were measured in the directions of three axes, i.e. their lengthwise, widthwise and thickness directions.

Table 2 shows the percentages of the tensile strengths in the minimum tensile strength direction to the tensile strengths in the maxium tensile strength direction and to the tensile strengths in the medium tensile strength direction. It also shows the percentages of the tensile strengths in the minimum tensile strength direction to the tensile strengths in the medium tensile strength direction.

Normally, the minimum tensile strength direction is the material's thickness direction, and the maximum tensile strength direction is the lengthwise or widthwise direction. The medium tensile strength direction is the direction that exhibits a tensile strength between the maximum tensile strength and the minimum tensile strength, and it is normally the widthwise direction.

[The Conditions in Measuring Tensile Strength]

The tensile strengths herein were measured with a constant-traverse-rate-type tensile tester, in accordance with the following conditions.

(1) The tensile strengths in the lengthwise and widthwise directions

Figure 15:
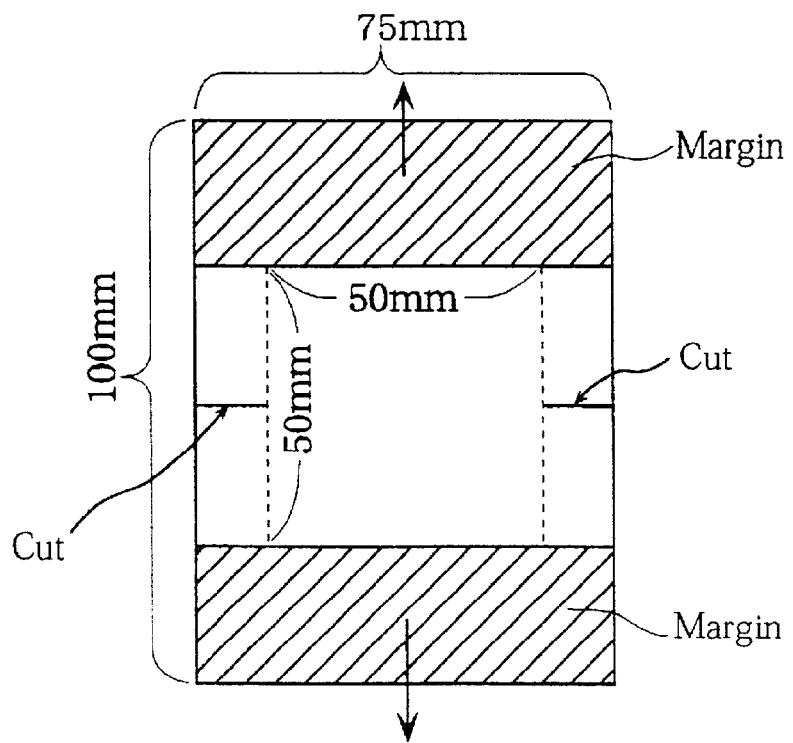
FIG. 15 is a diagram to explain the method of the tensile strength test (lengthwise direction and widthwise direction).

| Tensile strength test speed | 20 mm/min. |
|---|---|
| Specimen's length | 50 mm |
| Specimen size | 50 mm × 50 mm and a thickness of 25 mm (see FIG. 15) |

(2) The tensile strengths in the thickness direction

Figure 16:
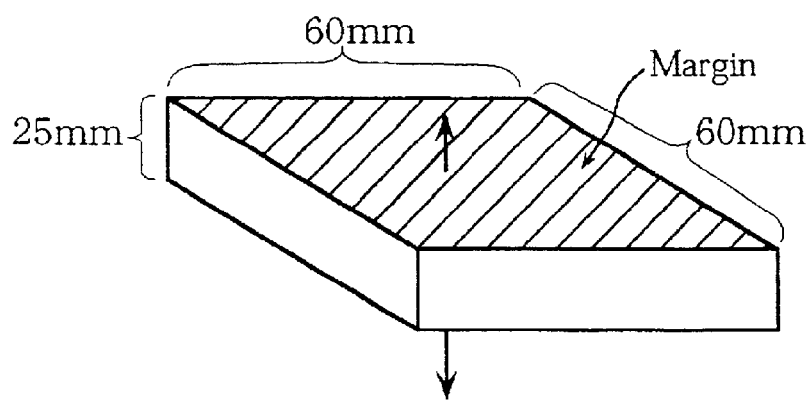
FIG. 16 is a diagram to explain the method of the tensile strength test (thickness direction).

| Tensile strength test speed | 20 mm/min. |
|---|---|
| Specimen's thickness | 25 mm |
| Specimen size | 60 mm × 60 mm and a thickness of 25 mm (see FIG. 16) |

The tensile strengths in the thickness direction were measured by pulling the plates attached onto both sides of a CF thermal-acoustic insulation material (the margins in FIG. 16) toward the directions indicated by the arrows. The thermal-acoustic insulation materials made of glass fibers, employed as a comparative subject herein, were produced from glass fibers having an average fiber diameter of 1 μm and an average fiber length of 10 mm.

TABLE 1

| Type of insulation | | Glass fiber | | CF | | | |
|---|---|---|---|---|---|---|---|
| Bulk density (kg/m$^3$) | | 5 | 10 | 3 | 5 | 7 | 10 |
| Tensile strength in three axis directions | Maximum tensile strength direction (lengthwise) | 1.0 | 0.25 | 0.21 | 1.5 | 2.7 | 5.2 |
| | Medium tensile strength direction (widthwise) | 0.35 | 0.19 | 0.21 | 1.3 | 2.6 | 4.9 |
| | Minimum tensile strength direction (thickness wise) | 0.010 | 0.010 | 0.012 | 0.085 | 0.14 | 0.15 |

Tensile strength: g/mm$^2$

TABLE 2

| Type of insulation | | Glass fiber | | CF | | | |
|---|---|---|---|---|---|---|---|
| Bulk density (kg/m$^3$) | | 5 | 10 | 3 | 5 | 7 | 10 |
| Tensile strength ratio* | Minimum to maximum | 1.0 | 4 | 5.7 | 5.7 | 5.2 | 2.9 |
| | Medium to maximum | 35 | 76 | 100 | 86 | 96 | 94 |
| | Minimum to medium | 2.9 | 5.3 | 5.7 | 6.5 | 5.4 | 3.1 |

*Percentage

As apparent in table 1, when compared at the same bulk densities, the CF thermal-acoustic insulation materials have greater tensile strengths than the materials made of glass fibers. In particular, a remarkable difference between these two materials is noted in the tensile strengths in the widthwise and thickness directions. More specifically, the tensile strength of the CF thermal-acoustic insulation material in the thickness direction is 8.5 times as that of the material made of glass fibers when the bulk density is 5 kg/m$^3$, and is 15 times as that of the material made of glass fibers when the bulk density is 10 kg/m$^3$.

Referring now to table 2, when each tensile strength ratio (percentage) of minimum to maximum, medium to maximum, and minimum to medium is compared at the same bulk density, the CF thermal-acoustic insulation materials have larger values than the materials made of glass fibers (conventional material). That is, the difference between the tensile strengths in each axis was smaller in the CF thermal-acoustic insulation materials. In particular, it is noted that the difference between the lengthwise direction and the widthwise direction was remarkably small in the CF thermal-acoustic insulation materials. More specifically, the tensile strength ratio of the medium tensile strength direction to the maximum tensile strength direction was equal to or greater than 86% in the CF thermal-acoustic insulation materials with a bulk density of 3 kg/m$^3$ to 10 kg/m$^3$. The ratio of the minimum tensile strength direction to the maximum tensile strength direction was equal to or greater than 5.4%.

In consideration of durability and handleability in manufacturing or mounting thermal-acoustic insulation materials, the difference of tensile strength between each direction in three axes should be rendered as small as possible. However, it is extremely difficult to eliminate the difference of the tensile strengths due to certain factors in manufacturing. The reason is that, when a method of producing a wool-like carbon fiber aggregate by accumulating carbon fibers is employed in manufacturing, many of the fibers composing the accumulated matter are oriented in the direction orthogonal to the gravitational direction because the fibers have a tendency to keep the orientation state more stable against gravitation. In other words, the fibers tend to be oriented in the lengthwise or widthwise direction. Therefore, the resulting thermal-acoustic insulation material produced by bonding the fibers having the aforementioned orientation state, the tensile strengths in the lengthwise and widthwise directions are likely to be too large while the tensile strength in the thickness direction is likely to be too small.

If the tensile strength difference of a CF thermal-acoustic insulation material is equal to or less than that of a conventional material, however, the handleability and durability thereof are guaranteed to be at least equal or superior to those of the conventional material. In other words, judging from table 2, when the percentage of the minimum to the maximum is controlled at 4% or higher, and the percentage of the medium to the maximum 35% or higher, the resulting material can achieve the handleability, mountability and durability equal or superior to the conventional material. From the results in table 2, it is understood that the CF thermal-acoustic insulation material with a bulk density of 3 $kg/m^3$ to 7 $kg/m^3$ can meet these conditions.

The description below will now detail a manufacturing method of a CF thermal-acoustic insulation material having the physical properties as described in the preceding sections.

First, anisotropic pitch obtained by polymerizing condensed polycyclic hydrocarbon is prepared in accordance with a publicly known art (Japanese Unexamined Patent Publication No. 63-146920). Second, spun fibers are produced by melting the pitch, and then discharging it from a spinning nozzle and at the same time blowing a heated gas from around the spinning nozzle in the same direction to which the melted pitch is discharged (preferably to the direction parallel to the discharge direction). The heated gas has a role to prevent the discharged pitch from being immediately cooled, and to obtain fibers having an appropriate length.

The aforementioned spun fibers are collected with, for example, a net and then subjected to infusibilizing treatment (oxidation treatment). Carbon fiber precursors are thereby produced. The carbon fiber precursors are then subjected to carbonizing treatment in an inert gas at 650° C. or higher, and the resulting fibers are employed as carbon fibers.

In the above method, it is possible to control an average diameter and average fiber length of the spun fibers at a desired value by varying a discharge outlet diameter of the spinning nozzle within the range of 0.5 mm to 0.2 mm and by adjusting the melt treatment temperature and discharge speed of the pitch as well as the temperature and discharge speed of the heated gas.

Although the diameters and lengths of the fibers slightly change after infusibilizing treatment and carbonizing treatment, there is practically no difference between the sizes of the spun fibers and those of the resulting carbon fibers, when the margin of error in the measurements is taken into account. Likewise, there is practically no difference in their average fiber diameters and average fiber lengths.

With employing the aforementioned carbon fibers, a CF thermal-acoustic insulation material of the present invention is prepared in accordance with the following manner.

First, a carbon fiber aggregate (sprayed and accumulated matter) wherein a thermosetting resin solution is sprayed is prepared according to either of the following methods. The first method is that the carbon fibers collected by a net and the like are opened by, for example, blowing the air, and then the opened fibers are dropped and accumulated with a thermosetting resin solution being sprayed to the fibers (spray and accumulation method). The second method is that, after the carbon fibers are opened as in the above method, the opened fibers are dropped and accumulated onto a plane to form a coarse wool-like aggregate, and thereafter a thermosetting resin solution is sprayed to the aggregate (accumulation—spray method).

Second, slight pressure is applied to the above-mentioned sprayed and accumulated matter with two pressing plates normally from the thickness directions, and then, with being kept in the pressed state, the matter is heated to cure the thermosetting resin A three-dimensional carbon fiber structure wherein the fiber contact points are bonded together by a thermosetting resin is thus formed. It is to be noted that the pressing plates may be applied from the directions orthogonal to the thickness directions.

It is to be understood that the CF thermal-acoustic insulation materials of the present invention may comprise only the aforementioned carbon fibers and thermosetting resin, or may comprise the aforementioned carbon fibers as a main constituent material and contain other fibers, insofar as the other fibers do not affect the acoustic and thermal insulation properties of the resulting material. Some examples of such fibers are; glass fibers, polyester fibers, ceramic fibers and the like.

More specifically, in the case where the amount of thermosetting resin to be added is represented by b $kg/m^3$, for example, if a bulk density of a carbon fiber aggregate is restricted at least within the range from (3-b) $kg/m^3$ to less than (10-b) $kg/m^3$, the resulting CF thermal-acoustic insulation material will have a bulk density within the range from 3 $kg/m^3$ to less than 10 $kg/m^3$.

In this case, it is preferable to restrict a bulk density of a carbon fiber aggregate (the bulk density after omitting b) at less than 1.3 $kg/m^3$ by adjusting the gap between the aforementioned two pressing plates in the heating and forming step, in order to obtain a formed matter (three-dimensional structure of carbon fibers) with a desired bulk density. When the aggregate has a bulk density of less than 1.3 $kg/m^3$, which is quite coarse, the fibers therein are oriented sufficiently unevenly. Consequently, the resulting three-dimensional carbon fiber structure becomes bulky (i.e., has a small bulk density), and moreover, only the contact points of the fibers therein are bonded in the structure. The structure thus obtained has more unvaried tensile strengths in the three-axis directions.

In preparing the aforementioned sprayed and accumulated matter, it is preferable to drop the opened carbon fibers from the height of 100 cm to a plane. The fibers are thereby oriented unevenly without using special equipment. The reason is, when the fibers are lightweight carbon fibers having an average fiber diameter of 0.5 $\mu$m to 2 $\mu$m and an average fiber length of 3 mm to 8 mm, and when the fibers are dropped from the height of 100 cm, some fibers are oriented in the gravitational direction but some in the orthogonal direction to it. Therefore, a bulky carbon fiber accumulation (wool-like carbon fiber aggregate) with a random fiber orientation can be obtained. Accordingly, a three-dimensional carbon fiber structure with a random fiber orientation can be obtained by spraying thermosetting resin solution to this accumulated matter.

Regarding a method of dropping carbon fibers, the carbon fibers may be dropped by free-fall, or an air current may be applied upward (the direction in which the falling speed is decreased) or downward (the direction in which the falling speed is increased). If the air current is applied, it is easier to obtain a fiber aggregate having a desired bulk density since the fiber orientation can be controlled.

In the case where the fibers are gradually dropped onto a plane by free-fall, as in snowfall, the single fibers are oriented quite unevenly in each direction in three axis. Even so, however, many fibers tend to orient in the direction parallel to the gravitation (the lengthwise or widthwise direction), resulting the tensile strength in the thickness direction smaller than the tensile strengths in the lengthwise or widthwise direction. If a particularly larger tensile strength in the thickness direction is required, a method in which pressure is applied from the lengthwise and/or widthwise direction with a press machine may be employed in the pressing step. When pressure is applied from these directions, the material with little difference between the tensile strengths in the three-axis direction can be obtained.

Among the thermosetting resins which may be employed in the aforementioned step are, for example, phenolic resins, melamine resins and silicone resins. The amount to be used is normally 10 wt. % to 40 wt. % to the CF thermal-acoustic insulation material, or more preferably 20 wt. % to 30 wt. %. It is not preferable if the value exceeds 40 wt. % because the portions of the fibers except the contact points will be bonded due to the excessive amount of the binder. On the other hand, if the value is less than 10 wt. %, the contact points will be insufficiently bonded and thereby resulting too small tensile strengths and compression recovery rates.

Regarding to phenolic resins, a heat treatment temperature in the aforementioned heating and forming step should be 150° C. to 250° C., normally 180° C. to 220° C.

In accordance with the manufacturing method described thus far, the CF thermal-acoustic insulation materials of the present invention having the properties as described in the preceding sections can be obtained.

Based on the examples, the further detailed description of the present invention will be given hereinafter.

EXAMPLES 1–4

A pitch with a softening point of 280° C. was obtained by polymerizing condensed polycyclic hydrocarbon, and the pitch was melted at 320° C. The melted pitch was discharged out of a spinning nozzle having a discharge hole with a diameter of 0.25 mm, and at the same time a heated gas with a temperature of 320° C. was blown in the direction the same as and parallel to the pitch discharging direction. The pitch was spun and thereby formed into fibers, and then collected with a net. The carbon fiber precursors thus obtained had a diameter from about 0.5 to 3.5 $\mu$m (an average fiber diameter of 1.3 $\mu$m) and a fiber length of 1 to 15 mm (an average fiber diameter of 5 mm). FIG. 1 shows a diameter distribution of the carbon fibers produced according to the above conditions.

Subsequently, the resulting fibers were infusibilized by heating in the air for 30 minutes at 300° C., and then carbonized by heating in an inert gas for 30 minutes at a predetermined temperature (650° C., 700° C., 750° C. or 800° C.). Four types of carbon fibers each carbonized at a different temperature were thus obtained. The diameters and fiber lengths of these carbon fibers were approximately equal to the aforementioned carbon fiber precursors.

Four types of CF thermal-acoustic insulation materials were prepared from the aforementioned four types of carbon fibers. More specifically, the carbon fibers were opened by blowing the air, and then the opened fibers were little by little dropped from a height of 100 cm onto a plane by free-fall, like the way snow falls, and a wool-like aggregate (non-bonded state) with a thickness of 120 mm and a bulk density of 0.7 kg/m$^3$ was thus obtained.

Subsequently, 20 wt. % phenolic resin solution whose amount was 150 wt. % based on the weight of this carbon fiber aggregate was sprayed to the aggregate, and then the aggregate was pressed with a pressing machine equipped with two pressing plates until the thickness of the aggregate became about 25 mm. (No pressure was applied to the lengthwise and widthwise directions.) The aggregate was heated to 200° C. with being held in the pressed state, and the phenolic resin was thus completely cured. Accordingly, three-dimensional carbon fiber structures (4 different types) having a bulk density of 4.8 kg/m$^3$ and a size of 1.5 m long, 0.5 m wide and 25 mm thick were produced, and the resulting structures were employed as CF thermal-acoustic insulation materials.

EXAMPLE 5

A CF thermal-acoustic insulation material of Example 5 with a bulk density of 4.0 kg/m$^3$ was prepared in the same manner as Examples 1 through 4 except that the carbonizing temperature was 700° C. and the thickness of the carbon fiber aggregate was 100 mm. The size and thickness of the material thus produced were the same as those of the materials produced according to Examples 1 through 4.

EXAMPLE 6

The CF thermal-acoustic insulation material of Example 6 having a bulk density of 7.0 kg/m$^3$ was prepared in the same manner as Examples 1 through 4 except that the carbonizing temperature was 700° C. and the thickness of the carbon fiber aggregate was 175 mm. The size and thickness of the material thus produced were the same as those of the materials produced according to Examples 1 through 4.

COMPARATIVE EXAMPLE 1

The CF thermal-acoustic insulation material of Comparative Example 1 was prepared in the same manner as Examples 1 through 4 except that the carbonizing temperature was 850° C. The size, thickness ard bulk density of the material thus produced were the same as those of the materials produced according to Examples 1 through 4.

COMPARATIVE EXAMPLE 2

The CF thermal-acoustic insulation material of Comparative Example 2 was prepared in the same manner as Examples 1 through 4 except that the carbonizing temperature was 900 (C. The size, thickness and bulk density of the material thus produced were the same as those of the material produced according to Examples 1 through 4.

COMPARATIVE EXAMPLE 3

The CF thermal-acoustic insulation material of Comparative Example 3 was prepared in the same manner as Examples 1 through 4 except that carbon fibers employed for this example were produced from isotropic pitch made from coal tar and carbonized at 950° C., and the carbon fibers had a fiber diameter of 13 $\mu$m and an average fiber diameter of 25 mm.

COMPARATIVE EXAMPLE 4

The glass fiber thermal-acoustic insulation material of Comparative Example 4 (thickness: 25 mm, bulk density:

6.7 kg/m³) was prepared from glass fibers having an average fiber diameter of 1.0 μm and an average fiber length of 10 mm, and by bonding the fibers with phenolic resin.

Each type of the thermal-acoustic insulation material of Examples 1 through 6 and Comparative Examples 1 through 4 was tested according to the same methods as described in "THE BEST MODE FOR CARRYING OUT THE PRESENT INVENTION" hereinbefore. Accompanied with the manufacturing conditions of the carbon fibers, the test results are set forth in Tables 3 and 4.

TABLE 3

| | Conditions of fibers | | | Properties of three-dimensional structures (thermal-acoustic insulation materials) | | |
|---|---|---|---|---|---|---|
| | Average diameter μm | Average length mm | Carbonizing temperature °C. | Bulk density kg/m³ | Galvanic current μA | Galvanic corrosion |
| Example 1 | 1.3 | 5 | 800 | 4.8 | 17 | ± |
| Example 2 | 1.3 | 5 | 750 | 4.8 | 1.8 | − |
| Example 3 | 1.3 | 5 | 700 | 4.8 | 0.1 | − |
| Example 4 | 1.3 | 5 | 650 | 4.8 | 0 | − |
| Example 5 | 1.3 | 5 | 700 | 4.0 | 0.1 | − |
| Example 6 | 1.3 | 5 | 700 | 7.0 | 0.1 | − |
| Comparative Example 1 | 1.3 | 5 | 850 | 4.8 | 56 | + |
| Comparative Example 2 | 1.3 | 5 | 900 | 4.8 | 110 | + |
| Comparative Example 3 | 13 | 25 | 950 | 12.0 | 36 | + |
| Comparative Example 4 | 1.0 | 10 | N/A | 6.7 | 0 | − |

TABLE 4

| | Tensile strength g/mm² | Tensile strength ratio (%) P2/P1 | Tensile strength ratio (%) P3/P1 | Thermal conductivity W/m·°C. | Acoustic absorptivity % (25 mm) 500 Hz | Acoustic absorptivity % (25 mm) 1000 Hz | Compression recovery rate % |
|---|---|---|---|---|---|---|---|
| Example 1 | 0.6 | 100 | 5.1 | 0.037 | 20 | 52 | 82 |
| Example 2 | 1.1 | 82 | 5.3 | 0.036 | 22 | 55 | 86 |
| Example 3 | 1.6 | 88 | 6.3 | 0.035 | 20 | 52 | 91 |
| Example 4 | 1.1 | 100 | 5.5 | 0.036 | 21 | 53 | 85 |
| Example 5 | 1.2 | 83 | 5.0 | 0.037 | 18 | 50 | 83 |
| Example 6 | 2.2 | 95 | 5.1 | 0.033 | 27 | 60 | 93 |
| Comparative Example 1 | 1.1 | * | * | 0.037 | 21 | 52 | 84 |
| Comparative Example 2 | 0.8 | * | * | 0.037 | 21 | 53 | 83 |
| Comparative Example 3 | 3.6 | * | * | 0.060 | 11 | 22 | 78 |
| Comparative Example 4 | 0.9 | 33 | 2.5 | 0.039 | 16 | 48 | 70 |

P1 Tensile strength in the lengthwise direction (Maximum tensile strength)
P2 Tensile strength in the widthwise direction
P3 Tensile strength in the thickness direction (Minimum tensile strength)
*Not measured As apparent in table 3, the galvanic currents in Examples 1 through 5 are 0.2 μA to 17 μA, and no galvanic corrosion was observed in Examples 2 through 6 although a very little galvanic corrosion was recognized in Example 1.

On the contrary, galvanic corrosion was obviously recognized in Comparative Example 1 (carbonizing treatment: 850° C., galvanic current: 56 μA), Comparative Example 2 (carbonizing treatment: 900° C., galvanic current: 110 μA), and Comparative Example 3 (carbonizing treatment: 950° C., galvanic current: 36 μA). The reason why no galvanic corrosion was recognized in Comparative Example 4 is that glass fibers do not generate galvanic current.

As shown in table 4, the tensile strength ratios (percentages) of Examples 1 through 6 were P2/P1=82–100, and P3/P1=5.6–6.3. Compared to these, in Comparative Example 4, the ratios are P2/P1=33 and P3/P1=2.5, which indicates the material of Comparative Example 4 has far greater difference in the tensile strengths in three axes than that of the CF thermal-acoustic insulation material of the present invention.

As to thermal conductivity (W/m·° C.), 0.035 to 0.037 were the thermal conductivities in Examples 1 through 4, in which the materials having a bulk density of 4.8 kg/m³ were employed. 0.037 was the value in Example 5, in which the material having a bulk density of 4.0 kg/m³ was employed, and 0.033 was the value in Example 6, in which the material having a bulk density of 7.0 kg/m³ was employed. Compared to these, 0.039 was the value in Comparative Example 4 (the thermal-acoustic insulation material made of glass fibers), in which the material having a bulk density of 6.7 kg/m³ was employed. These results demonstrate that the CF thermal-acoustic insulation materials of the present invention can achieve higher thermal insulation quality with a smaller bulk density when compared to the material made of glass fibers. It is to be noted that the smaller the thermal conductivity is, the better the thermal insulation quality.

As to vertical incident acoustic absorptivities at 1000 Hz (%) in a thickness of 25 mm, 52 to 55 are the values in Examples 1 through 4 with the materials having a bulk density of 4.8 kg/m³, 50 in Example 5 with the material having a bulk density of 4.0 kg/m³, 60 in Example 6 with the material having a bulk density of 7.0 kg/m³. Compared to these, 48 is the value in Comparative Example 4 (the thermal-acoustic insulation material made of glass fibers) with the material having a bulk density of 6.7 kg/m³. As similar to the above results, these results also demonstrate that the CF thermal-acoustic insulation materials of the present invention can achieve greater sound insulating effect with a smaller bulk density when compared to the material made of glass fibers.

INDUSTRIAL APPLICABILITY

As has been described, the present invention can attain each of the previously-mentioned objects satisfactorily. A thermal-acoustic insulation material having high degree of thermal and acoustic insulation quality as well as excellent tensile strength and compression resilience can be obtained in accordance with the present invention. Furthermore, since the thermal-acoustic insulation material of the present invention comprises carbon fibers as a main constituent material, the resulting material has favorable properties intrinsic to carbon fibers such as lightness, chemical stability, incombustiblity, non-hygroscopicity and such properties that the material do not generate toxic fumes in case of fire. Moreover, the material of the present invention retains improved qualities in galvanic corrosiveness and non-electrical conductivity, both of which are drawbacks of the thermal-acoustic insulation material comprising carbon fibers. In addition, the material of the present invention possesses remarkably improved mechanical characteristics such as excellent tensile strength and compression recovery rate.

The thermal-acoustic insulation material as such not only excels in thermal and acoustic insulation quality in its initial mounting, but also does not suffer the deterioration of the quality even after long use. Further, the material does not cause galvanic corrosion to the members surrounding it and does not bring about short circuits resulting from the material itself or the fibers detached from the material in the electric circuits thereabout.

The present invention has a significant value in industrial applicability in that it can provide a CF thermal-acoustic insulation material not only usable for a member capable of saving energy consumption in housing and the like, but also suitably usable for aircraft, high-speed train cars, spacecraft and the like, wherein constant vibration exists, a great deal of metal material is used, and various electrical equipment is mounted.

What is claimed is:

1. A thermal acoustic insulation material comprising:
a multiplicity of anisotropic pitch-based carbon fibers having an average fiber diameter of 1.3 µm or less and an average fiber length of 1 mm to 15 mm, said carbon fibers being non-galvanic corrosive and being bonded by a thermosetting resin at contact points of said carbon fibers so as to form a carbon fiber aggregate having a bulk density of from 3 kg/m$^3$ to 10 kg/m$^3$;
wherein said thermal-acoustic insulation material is non-galvanic corrosive.

2. A thermal-acoustic insulation material as in claim 1, wherein said thermal-acoustic insulation material shows a galvanic current of 10 µA or lower in a galvanic cell having an electrode made of said thermal-acoustic insulation material, another electrode made of an aluminum plate, and an electrolytic solution of 0.45 wt. % aqueous sodium chloride solution.

3. A thermal-acoustic insulation material as in claim 2, which has a maximum tensile strength of 1.0 g/mm$^2$ or higher.

4. A thermal-acoustic insulation material as in claim 2, which has a compression recovery rate of 70% or higher.

5. A thermal-acoustic insulation material as in claim 2, wherein a minimum tensile strength of the orthogonal direction to said maximum tensile strength is 0.04 times or higher as said maximum tensile strength and, at the same time, a tensile strength of the orthogonal direction to both the direction of said maximum tensile strength and the direction of said minimum tensile strength is 0.76 times or higher as said maximum tensile strength.

6. A thermal-acoustic insulation material as in claim 2, which has a thermal conductivity of 0.039 W/m·° C. or lower.

7. A thermal-acoustic insulation material as in claim 2, wherein a vertical incident acoustic absorptivity at a frequency of 1000 Hz of said thermal-acoustic insulation material with a thickness of 25 mm is 48% or higher.

8. A thermal-acoustic insulation material as in claim 2, wherein said carbon fibers are produced from anisotropic pitch obtained by polymerizing condensed polycyclic hydrocarbon.

9. A thermal-acoustic insulation material as in claim 1, wherein said anisotropic pitched-based carbon fibers have an average fiber diameter of from 0.5 µm to 1.0 µm.

10. A thermal-acoustic insulation material as in claim 9, which has a maximum tensile strength of 1.0 g/mm$^2$ or higher.

11. A thermal-acoustic insulation material as in claim 9, which has a compression recovery rate of 70% or higher.

12. A thermal-acoustic insulation material as in claim 9, wherein a minimum tensile strength of the orthogonal direction to said maximum tensile strength is 0.04 times or higher as said maximum tensile strength and, at the same time, a tensile strength of the orthogonal direction to both the direction of said maximum tensile strength and the direction of said minimum tensile strength is 0.76 times or higher as said maximum tensile strength.

13. A thermal-acoustic insulation material as in claim 9, which has a thermal conductivity of 0.039 W/m·° C. or lower.

14. A thermal-acoustic insulation material as in claim 9, wherein a vertical incident acoustic absorptivity at a frequency of 1000 Hz of said thermal-acoustic insulation material with a thickness of 25 mm is 48% or higher.

15. A thermal-acoustic insulation material as in claim 9, wherein said carbon fibers are produced from anisotropic pitch obtained by polymerizing condensed polycyclic hydrocarbon.

16. A thermal-acoustic insulation material as in claim 1, which has a maximum tensile strength of 1.0 g/mm$^2$ or higher.

17. A thermal-acoustic insulation material as in claim 16, which has a compression recovery rate of 70% of higher.

18. A thermal-acoustic insulation material as in claim 16, wherein a minimum tensile strength of the orthogonal direction to said maximum tensile strength is 0.04 times or higher as said maximum tensile strength and, at the same time, a tensile strength of the orthogonal direction to both the direction of said maximum tensile strength and the direction of minimum tensile strength is 0.76 times or higher as said maximum tensile strength.

19. A thermal-acoustic insulation material as in claim 16, which has a thermal conductivity of 0.039 W/m·° C. or lower.

20. A thermal-acoustic insulation material as in claim 16, wherein a vertical incident acoustic absorptivity at a frequency of 1000 Hz of said thermal-acoustic insulation material with a thickness of 25 mm is 48% or higher.

21. A thermal-acoustic insulation material as in claim 16, wherein said carbon fibers are produced from anisotropic pitch obtained by polymerizing condensed polycyclic hydrocarbon.

22. A thermal-acoustic insulation material as in claim 1, which has a compression recovery rate of 70% or higher.

23. A thermal-acoustic insulation material as in claim 22, wherein a minimum tensile strength of the orthogonal direction to said maximum tensile strength is 0.04 times or higher as said maximum tensile strength and, at the same time, a tensile strength of the orthogonal direction to both the direction of said maximum tensile strength and the direction of minimum tensile strength is 0.76 times or higher as said maximum tensile strength.

24. A thermal-acoustic insulation material as in claim 22, which has a thermal conductivity of 0.039 W/m·° C. or lower.

25. A thermal-acoustic insulation material as in claim 22, wherein a vertical incident acoustic absorptivity at a frequency of 1000 Hz of said thermal-acoustic insulation material with a thickness of 25 mm is 48% or higher.

26. A thermal-acoustic insulation material as in claim 22, wherein said carbon fibers are produced from anisotropic pitch obtained by polymerizing condensed polycyclic hydrocarbon.

27. A thermal-acoustic insulation material as in claim 1, wherein a minimum tensile strength of the orthogonal direction to said maximum tensile strength is 0.04 times or higher as said maximum tensile strength and, at the same time, a tensile strength of the orthogonal direction to both the direction of said maximum tensile strength and the direction of said minimum tensile strength is 0.76 times or higher as said maximum tensile strength.

28. A thermal-acoustic insulation material as in claim 27, which has a thermal conductivity of 0.039 W/m·° C. or lower.

29. A thermal-acoustic insulation material as in claim 27, wherein a vertical incident acoustic absorptivity at a frequency of 1000 Hz of said thermal-acoustic insulation material with a thickness of 25 mm is 48% or higher.

30. A thermal-acoustic insulation material as in claim 27, wherein said carbon fibers are produced from anisotropic pitch obtained by polymerizing condensed polycyclic hydrocarbon.

31. A thermal-acoustic insulation material as in claim 1, which has a thermal conductivity of 0.039 W/m·° C. or lower.

32. A thermal-acoustic insulation material as in claim 31, wherein a vertical incident acoustic absorptivity at a frequency of 1000 Hz of said thermal-acoustic insulation material with a thickness of 25 mm is 48% or higher.

33. A thermal-acoustic insulation material as in claim 31, wherein said carbon fibers are produced from anisotropic pitch obtained by polymerizing condensed polycyclic hydrocarbon.

34. A thermal-acoustic insulation material as in claim 1, wherein a vertical incident acoustic absorptivity at a frequency of 1000 Hz of said thermal-acoustic insulation material with a thickness of 25 mm is 48% or higher.

35. A thermal-acoustic insulation material as in claim 34, wherein said carbon fibers are produced from anisotropic pitch obtained by polymerizing condensed polycyclic hydrocarbon.

36. A thermal-acoustic insulation material as in claim 1, wherein said carbon fibers are produced from anisotropic pitch obtained by polymerizing condensed polycyclic hydrocarbon.

37. A method of manufacturing thermal-acoustic insulation material, comprising the steps of:

producing spun fibers having an average fiber diameter less than 2 am and an average fiber length of 1 mm to 15 mm by heating and melting anisotropic pitch obtained by polymerizing condensed polycyclic hydrocarbon, then discharging a melted matter out of a spinning nozzle and at the same time, blowing a heated gas from around the spinning nozzle in the same direction in which the melted matter is discharged;

manufacturing non-galvanic corrosive carbon fibers by infusibilizing said spun fibers and thereafter carbonizing said spun fibers at not lower than 550° C. but lower than 800° C.;

forming a carbon fiber aggregate having a bulk density less than 1.3 kg/m³ by aggregating said non-galvanic corrosive carbon fibers;

spraying a thermosetting resin solution to the carbon fiber aggregate; and curing the thermosetting resin by compressing and heating the carbon fiber aggregate sprayed with the thermosetting resin solution to bond contact points of said carbon fibers and thereby manufacture a three dimensional structure of carbon fibers having a bulk density of from 3 kg/m³ to 10 kg/m³.

38. A method of manufacturing a thermal-acoustic insulation material as in claim 37, wherein in said step of forming a carbon fiber aggregate, said non-galvanic corrosive carbon fibers are opened by the air and dropped from a height of at least 100 cm or higher onto a plane.

39. A method of manufacturing a thermal-acoustic insulation material as in claim 37, wherein a temperature of carbonizing the spun fibers is not lower than 650° C. but lower than 750° C.

40. A method of manufacturing a thermal-acoustic insulation material, comprising the steps of:

producing spun fibers having an average fiber diameter of 1.3 μm or less and an average fiber length of 1 mm to 15 mm, said producing comprising heating and melting anisotropic pitch obtained by polymerizing condensed polycyclic hydrocarbon to produce melted pitch, and discharging said melted pitch out of a spinning nozzle while at the same time, blowing a heated gas from around the spinning nozzle in the same direction that the melted pitch is discharged, to form said spun fibers;

manufacturing non-galvanic corrosive carbon fibers comprising infusibilizing said spun fibers to form infusibilized fibers and carbonizing said infusibilized fibers at not lower than 550° C. but lower than 800° C., to form said non-galvanic corrosive carbon fibers;

forming a carbon fiber aggregate comprising aggregating and compressing said non-galvanic corrosive carbon fibers to a bulk density of from (3–b) kg/m³ to (10–b) kg/m³, to form said carbon fiber aggregate;

spraying a thermosetting resin solution to said carbon fiber aggregate so that the amount of a thermosetting resin in relation to the amount of the carbon fiber aggregate is b, where b is an arbitrary number fixed so that the bulk density is positive and the relationship $0.3 \leq b \leq 4$ is satisfied, to form a sprayed aggregate; and curing said thermosetting resin comprising heating said sprayed aggregate, to form a three-dimensional structure of carbon fibers, wherein said carbon fibers are bonded at contact points thereof, and said three-dimensional structure has a bulk density of from 3 kg/m³ to 10 kg/m³.

41. The method of manufacturing a thermal-acoustic insulation material as in claim 40, wherein said carbonizing is carried out at a temperature of not lower than 650° C., but lower than 750° C.

* * * * *

UNITED STATES PATENT AND TRADEMARK OFFICE
CERTIFICATE OF CORRECTION

PATENT NO. : 6,855,398 B1
DATED : February 15, 2005
INVENTOR(S) : Machino et al.

It is certified that error appears in the above-identified patent and that said Letters Patent is hereby corrected as shown below:

Title page,
Item [54], Title, should be -- THERMAL-ACOUSTIC INSULATION, AND METHOD OF MANUFACTURING SAME --.
Item [57], ABSTRACT,
Line 5, change "The material" to -- The insulation material --.
Line 11, change "the material" to -- the insulation material --.

Column 23,
Line 46, change "2 am" to -- $2\,\mu\mathrm{m}$ --.

Signed and Sealed this

Seventh Day of February, 2006

JON W. DUDAS
*Director of the United States Patent and Trademark Office*